(12) United States Patent
Duppert

(10) Patent No.: US 9,890,784 B2
(45) Date of Patent: Feb. 13, 2018

(54) CAST-IN OFFSET FIXED SCROLL INTAKE OPENING

(71) Applicant: Ronald J. Duppert, Fayetteville, NY (US)

(72) Inventor: Ronald J. Duppert, Fayetteville, NY (US)

(73) Assignee: BITZER Kuehlmaschinenbau GmbH, Sindelfingen (DE)

( * ) Notice: Subject to any disclaimer, the term of this patent is extended or adjusted under 35 U.S.C. 154(b) by 232 days.

(21) Appl. No.: 14/754,885

(22) Filed: Jun. 30, 2015

(65) Prior Publication Data

US 2017/0002811 A1    Jan. 5, 2017

(51) Int. Cl.
*F04C 18/02* (2006.01)
*F04C 29/12* (2006.01)
(Continued)

(52) U.S. Cl.
CPC .......... *F04C 18/0253* (2013.01); *B22D 25/02* (2013.01); *B22D 31/002* (2013.01);
(Continued)

(58) Field of Classification Search
CPC .............. F04C 18/0215; F04C 18/0246; F04C 18/0253; F04C 18/0261; F04C 29/12; F04C 2250/10; F04C 2250/101; F04C 2230/00; F04C 2230/10; F04C 2230/21; F04C 23/008; F04C 15/06; B22D 31/00; B22D 31/002; B22D 25/02; B22D 11/126; B22D 19/00; Y10T 29/4924; Y10T 29/49236; Y10T 29/49995; Y10T 29/49996; Y10T 29/49989; B23P 15/00

USPC .................. 418/55.1–55.6, 1, 183; 29/527.6, 29/888.022, 888.02, 557, 558; 164/69.1, 164/70.1, 76.1
See application file for complete search history.

(56) References Cited

U.S. PATENT DOCUMENTS 6,048,142 A * 4/2000 Hashimoto ............... B23C 3/12
                                                    29/888.022
6,171,084 B1   1/2001 Wallis et al.
(Continued)

FOREIGN PATENT DOCUMENTS

WO    WO 2013/142696 A1    9/2013

*Primary Examiner* — Mark Laurenzi
*Assistant Examiner* — Xiaoting Hu
(74) *Attorney, Agent, or Firm* — Reinhart Boerner Van Deuren P.C.

(57) ABSTRACT

A fixed scroll compressor body includes a scroll compressor body casting. The casting has a central body portion having a plate-like base with a spiral scroll rib projecting from the base at a right angle thereto. The spiral scroll rib includes a volume between the spiraled ribs for the compressing of refrigerant. The spiral scroll rib spirals from a central region of the plate-like base to an outer wall of the central body portion. The casting further includes a first inward-protruding portion that protrudes from the outer wall into the volume. A distance that the first inward-protruding portion protrudes into the volume is greater than a thickness of the first inward-protruding portion such that removal of the first inward-protruding portion results in a first intake opening in the outer wall. The first intake opening provides a path for a flow of refrigerant into the volume.

22 Claims, 7 Drawing Sheets

(51) Int. Cl.
   *B22D 25/02* (2006.01)
   *B22D 31/00* (2006.01)
   *B23P 15/00* (2006.01)

(52) U.S. Cl.
   CPC .......... *B23P 15/00* (2013.01); *F04C 18/0215* (2013.01); *F04C 18/0261* (2013.01); *F04C 29/12* (2013.01); *F04C 2230/10* (2013.01); *F04C 2230/21* (2013.01); *F04C 2250/101* (2013.01)

(56) References Cited

U.S. PATENT DOCUMENTS

| | | | |
|---|---|---|---|
| 6,364,643 B1 * | 4/2002 | Milliff | F04C 18/0253 418/15 |
| 6,398,530 B1 | 6/2002 | Hasemann | |
| 6,428,292 B1 | 8/2002 | Wallis et al. | |
| 6,582,211 B2 | 6/2003 | Wallis et al. | |
| 6,814,551 B2 | 11/2004 | Kammhoff et al. | |
| 6,960,070 B2 | 11/2005 | Kammhoff et al. | |
| 7,112,046 B2 | 9/2006 | Kammhoff et al. | |
| 7,997,877 B2 | 8/2011 | Beagle et al. | |
| 2002/0098100 A1 * | 7/2002 | Mori | F04C 18/0246 418/55.2 |
| 2002/0148592 A1 * | 10/2002 | Mori | B22D 17/22 164/137 |
| 2006/0159580 A1 * | 7/2006 | Matsuhashi | B23D 5/02 418/55.2 |
| 2006/0222545 A1 * | 10/2006 | Nam | F04C 18/0253 418/55.1 |
| 2010/0111739 A1 * | 5/2010 | Murakami | F04C 18/0215 418/55.1 |
| 2010/0172781 A1 | 7/2010 | Kuwahara et al. | |
| 2010/0202910 A1 | 8/2010 | Yamamoto et al. | |
| 2011/0064597 A1 * | 3/2011 | Duppert | F04C 18/0215 418/55.4 |
| 2013/0087299 A1 * | 4/2013 | Williamson | B22D 25/02 164/47 |
| 2013/0251568 A1 | 9/2013 | Bush | |

\* cited by examiner

CAST-IN OFFSET FIXED SCROLL INTAKE OPENING

FIELD OF THE INVENTION

This invention generally relates to scroll compressors used for the compressing of refrigerant.

BACKGROUND OF THE INVENTION

A scroll compressor is a certain type of compressor that is used to compress refrigerant for such applications as refrigeration, air conditioning, industrial cooling and freezer applications, and/or other applications where compressed fluid may be used. Such prior scroll compressors are known, for example, as exemplified in U.S. Pat. No. 6,398,530 to Hasemann; U.S. Pat. No. 6,814,551, to Kammhoff et al.; U.S. Pat. No. 6,960,070 to Kammhoff et al.; U.S. Pat. No. 7,112,046 to Kammhoff et al.; and U.S. Pat. No. 7,997,877, to Beagle et al., all of which are assigned to a Bitzer entity related to the present assignee. As the present disclosure pertains to improvements that can be implemented in these or other scroll compressor designs, the disclosures of U.S. Pat. Nos. 6,398,530, 7,112,046, 6,814,551, and 6,960,070 are hereby incorporated by reference in their entireties.

Additionally, particular embodiments of scroll compressors are disclosed in U.S. Pat. No. 6,582,211 to Wallis et al., U.S. Pat. No. 6,428,292 to Wallis et al., and U.S. Pat. No. 6,171,084 to Wallis et al., the teaching and disclosures of which are hereby incorporated by reference in their entireties.

As is exemplified by these patents, scroll compressors conventionally include an outer housing having a scroll compressor contained therein. A scroll compressor includes first and second scroll compressor members. A first compressor member is typically arranged stationary and fixed in the outer housing. A second scroll compressor member is moveable relative to the first scroll compressor member in order to compress refrigerant between respective scroll ribs which rise above the respective bases and engage in one another. Conventionally the moveable scroll compressor member is driven about an orbital path about a central axis for the purpose of compressing refrigerant. An appropriate drive unit, typically an electric motor, is usually provided within the same housing to drive the movable scroll member.

Embodiments of the present invention represent an advance over the state of the art with respect to scroll compressors. These and other advantages of the invention, as well as additional inventive features, will be apparent from the description of the invention provided herein.

BRIEF SUMMARY OF THE INVENTION

In one aspect, embodiments of the invention provide a fixed scroll compressor body that includes a scroll compressor body casting. The casting has a central body portion with a plate-like base and a spiral scroll rib projecting axially from the plate-like base. The spiral scroll rib includes a volume between the spiraled ribs for the compressing of refrigerant. The spiral scroll rib spirals from a central region of the plate-like base to an outer wall of the central body portion. A first inward-protruding portion that protrudes from the outer wall into the volume. A radially-extending distance that the first inward-protruding portion protrudes into the volume is greater than a radial-extending thickness of the first inward-protruding portion such that removal of the first inward-protruding portion is configured to result in a first intake opening in the outer wall. The first intake opening provides a path for a flow of refrigerant into the volume.

In a particular embodiment, the fixed scroll compressor body further includes a second inward-protruding portion that protrudes from the outer wall into the volume. A distance that the second inward-protruding portion protrudes into the volume is greater than a thickness of the second inward-protruding portion such that removal of the second inward-protruding portion results in a second intake opening in the outer wall. In a more particular embodiment, the second intake opening is located on a side of the central body portion opposite the first intake opening. The first inward-protruding portion may be rectangular, though other shapes for the first inward-protruding portion are envisioned.

In certain embodiments, the casting has an outer surface configured to be cast without cores in a two-part mold, the outer surface having a top side surface facing vertically upward and a bottom side surface facing vertically downward, wherein the top side surface is free of any radially-extending undercuts and wherein the bottom side surface is free of any radially-extending undercuts.

In some embodiments, the outer wall includes a first axially-extending segment, and includes the first inward-protruding portion which provides a second axially-extending segment. The first and second axially-extending segments are joined by a radially-extending step that form part of the inward protruding portion, such that the first axially-extending segment is radially offset and radially outward from the second axially-extending segment. The second axially-extending segment extends from the radially-extending step to a perimeter of the plate-like base. The first axially-extending segment is radially offset from the second axially-extending segment by at least one-eighth (⅛) of an inch.

In another aspect, embodiments of the invention provide a method of manufacturing a scroll compressor body. The method includes providing a clamshell-type casting mold for a scroll compressor body, and casting the scroll compressor body. Casting the scroll compressor body includes casting the scroll compressor body with a central body portion having a plate-like base with a spiral scroll rib projecting axially from the plate-like base. The spiral scroll rib includes a volume between the spiraled ribs for the compressing of refrigerant. The spiral scroll rib spirals from a central region of the plate-like base to an outer wall of the central body portion. A first inward-protruding portion protrudes from the outer wall into the volume. A distance that the first inward-protruding portion protrudes into the volume is greater than a thickness of the first inward-protruding portion such that removal of the first inward-protruding portion results in a first intake opening in the outer wall. The first intake opening provides a path for a flow of refrigerant into the volume. The method further includes inserting a tool between the spiral scroll ribs to machine surfaces of the scroll ribs, and locating the first inward-protruding portion such that the tool removes the first inward-protruding portion while machining the surfaces of the scroll ribs.

In certain embodiments, the method calls for casting the scroll compressor body with a second inward-protruding portion that protrudes from the outer wall into the volume. A distance that the second inward-protruding portion protrudes into the volume is greater than a thickness of the second inward-protruding portion such that removal of the second inward-protruding portion results in a second intake opening in the outer wall. The second intake opening provides a path for a flow of refrigerant into the volume.

The method may also include locating the second intake opening on a side of the central body portion opposite the first intake opening. Furthermore, the method may call for casting the scroll compressor body with a rectangular first inward-protruding portion. Certain embodiments call for casting the scroll compressor body with a two-piece mold having only a mold cope and a mold drag, the two-piece mold having no core inserts. The method may require using a single tool bit to simultaneously machine an axially-extending surface of the scroll ribs while removing the first inward-protruding portion. Embodiments of the method may further include aligning the single tool bit parallel to a central axis of the scroll compressor body.

In a particular embodiment, simultaneously machining the axially-extending surfaces of the scroll ribs and to remove the first inward-protruding portion results in at least two unmachined edge surfaces: 1) a radially-extending edge of a first axially-extending segment of the outer wall, the radially-extending edge defining a first side of the first intake opening; and 2) an axially-extending edge of a perimeter of the plate-like base, the axially-extending edge defining a second side of the first intake opening opposite the first side.

In another aspect, embodiments of the invention provide a scroll compressor having scroll compressor bodies disposed in a housing. The scroll bodies including a fixed scroll body and a moveable scroll body. The fixed and moveable scroll bodies have respective bases and respective scroll ribs that project from the respective bases. The scroll ribs mutually engage, and the moveable scroll body is movable relative to the fixed scroll body for compressing fluid. The fixed scroll compressor body has a scroll compressor body with a central body portion having a plate-like base with a spiral scroll rib projecting axially therefrom. The spiral scroll rib includes a volume between the spiraled ribs for the compressing of refrigerant. The spiral scroll rib spirals from a central region of the plate-like base to an outer wall of the central body portion. There is a first intake opening in the outer wall. The first intake opening provides a path for a flow of refrigerant into the volume. The outer wall has a machined inner peripheral surface surrounding at least three sides of the first intake opening. The first intake opening includes an unmachined axially-extending edge segment that defines a first side of the first intake opening, and further includes an unmachined radially axially-extending segment that defines a second side of the first intake opening opposite the first side.

In some embodiments, the fixed scroll compressor body further includes a second intake opening formed in a different part of the outer wall than the first intake opening. The second intake opening provides a path for a flow of refrigerant into the volume. The outer wall has a machined inner peripheral surface surrounding at least three sides of the second intake opening. The second intake opening includes an unmachined axially-extending edge segment that defines a first side of the second intake opening, and further includes an unmachined radially axially-extending segment that defines a second side of the second intake opening opposite the first side. The second intake opening may be located on a side of the central body portion opposite the first intake opening.

In some embodiments, the machined inner peripheral surface has a surface roughness that is less than that of the unmachined radially axially-extending segment, and is also less than that of the unmachined axially-extending edge segment. In certain embodiments, the first intake opening is rectangular. In a further embodiment, the unmachined radially axially-extending segment is radially offset and radially outward from the unmachined axially-extending edge segment with respect to a central axis of the fixed scroll compressor body. In a more particular embodiment, the unmachined radially axially-extending segment is radially offset from the unmachined axially-extending edge segment by at least one-eighth (⅛) of an inch.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

Figure 1:
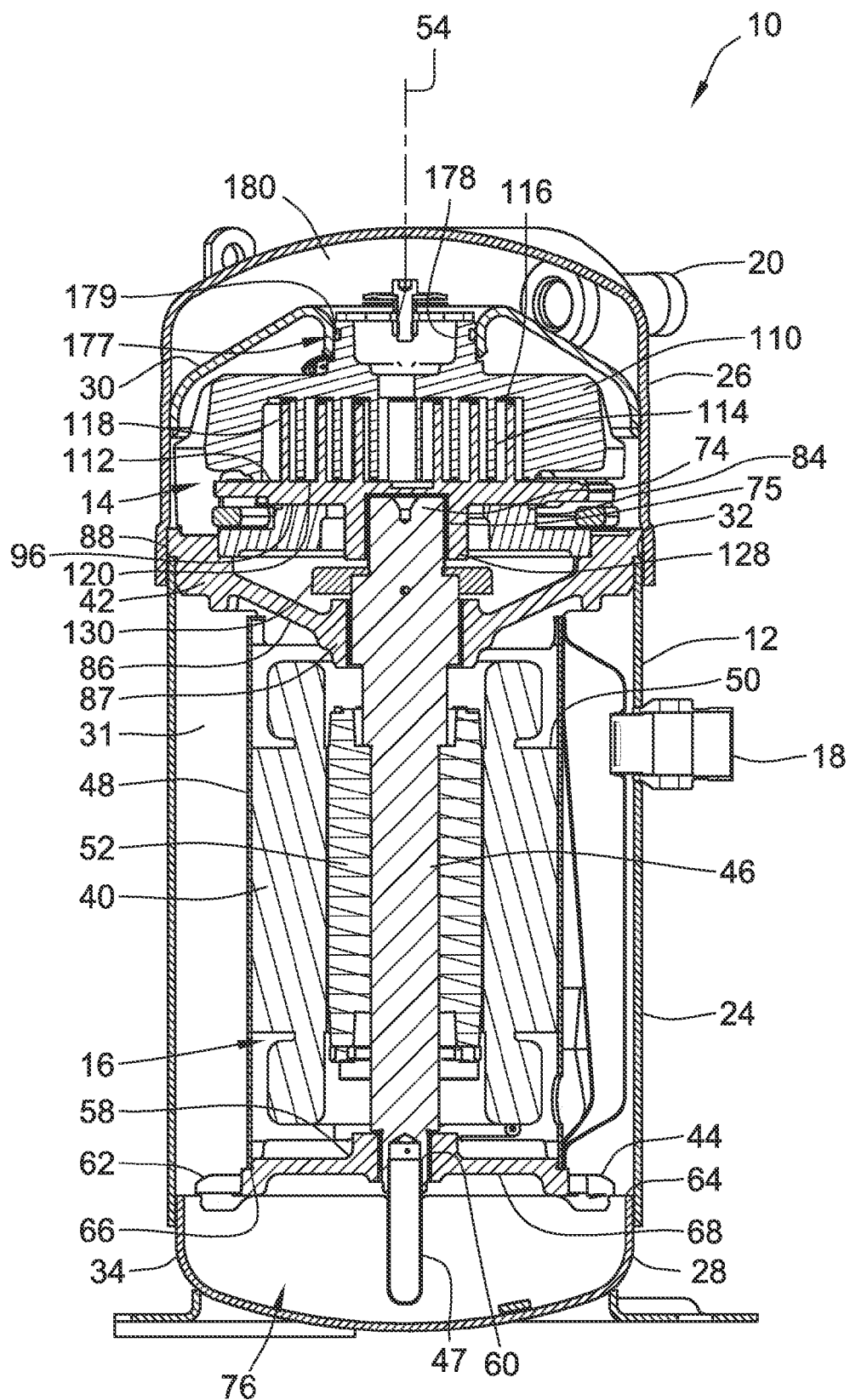
FIG. 1 is a cross-sectional isometric view of a scroll compressor assembly, according to an embodiment of the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

An embodiment of the present invention is illustrated in FIGS. 1-4 as a scroll compressor assembly 10 generally including an outer housing 12 in which a scroll compressor 14 can be driven by a drive unit 16. The scroll compressor assembly 10 may be arranged in a refrigerant circuit for refrigeration, industrial cooling, freezing, air conditioning or other appropriate applications where compressed fluid is desired. Appropriate connection ports provide for connection to a refrigeration circuit and include a refrigerant inlet port 18 and a refrigerant outlet port 20 extending through the outer housing 12. The scroll compressor assembly 10 is operable through operation of the drive unit 16 to operate the scroll compressor 14 and thereby compress an appropriate refrigerant or other fluid that enters the refrigerant inlet port 18 and exits the refrigerant outlet port 20 in a compressed high-pressure state.

The outer housing 12 for the scroll compressor assembly 10 may take many forms. In particular embodiments of the invention, the outer housing 12 includes multiple shell sections. In the embodiment of FIG. 1, the outer housing 12 includes a central cylindrical housing section 24, and a top end housing section 26, and a bottom end housing section 28. In certain embodiments, the housing sections 24, 26, 28 are formed of appropriate sheet steel and welded together to make a permanent outer housing 12 enclosure. However, if disassembly of the housing is desired, other housing assembly provisions can be made that can include metal castings or machined components, wherein the housing sections 24, 26, 28 are attached using fasteners.

As can be seen in the embodiment of FIG. 1, the central housing section 24 is cylindrical, joined with the top end housing section 26. In this embodiment, a separator in the form of separator plate 30 is disposed in the top end housing section 26. Each of the top and bottom end housing sections 26, 28 are generally dome shaped and include respective cylindrical side wall regions 32, 34 that assemble to the center section 24 and provide for closing off the top and bottom ends of the outer housing 12. As can be seen in FIG. 1, the top side wall region 32 telescopically overlaps the central housing section 24 and is exteriorly welded along a circular welded region to the top end of the central housing section 24. Similarly, a bottom portion of the central cylindrical housing section 24 overlaps the side wall region 34.

During assembly, these components may be assembled such a single circumferential weld around the inner surface of the outer housing 12 joins the top end housing section 26 and the separator plate 30. A second circumferential weld may externally join the top end housing section 26 and central cylindrical housing section 24. In particular embodiments, the central cylindrical housing section 24 is welded to the bottom shell 28, though, as stated above, alternate embodiments would include other methods of joining (e.g., fasteners) these sections of the outer housing 12.

While the separator plate 30 could be a stamped steel component, it could also be constructed as a cast and/or machined member (and may be made from steel or aluminum) to provide the ability and structural features necessary to operate in proximity to the high-pressure refrigerant gases output by the scroll compressor 14. By casting or machining the separator plate 30 in this manner, heavy stamping of such components can be avoided.

Assembly of the outer housing 12 results in the formation of an enclosed chamber 31 that surrounds the drive unit 16, and partially surrounds the scroll compressor 14. In particular embodiments, the top end housing section 26 is generally dome-shaped and includes a respective cylindrical side wall region 32 that abuts the top of the central cylindrical housing section 24, and provides for closing off the top end of the outer housing 12.

In a particular embodiment, the drive unit 16 in is the form of an electrical motor assembly 40. The electrical motor assembly 40 operably rotates and drives a shaft 46. Further, the electrical motor assembly 40 generally includes an outer annular motor housing 48, a stator 50 comprising electrical coils and a rotor 52 that is coupled to the drive shaft 46 for rotation together. In a particular embodiment, the rotor 52 is mounted on the drive shaft 46, which is supported by upper and lower bearing members 42, 44. Energizing the stator 50 is operative to rotatably drive the rotor 52 and thereby rotate the drive shaft 46 about a central axis 54.

Applicant notes that when the terms "axial" and "radial" are used herein to describe features of components or assemblies, they are defined with respect to the central axis 54. Specifically, the term "axial" or "axially-extending" refers to a feature that projects or extends in a direction generally parallel to the central axis 54, while the terms "radial" or "radially-extending" indicates a feature that projects or extends in a direction generally perpendicular to the central axis 54. Some minor variation from parallel and perpendicular is permissible.

Figure 4:
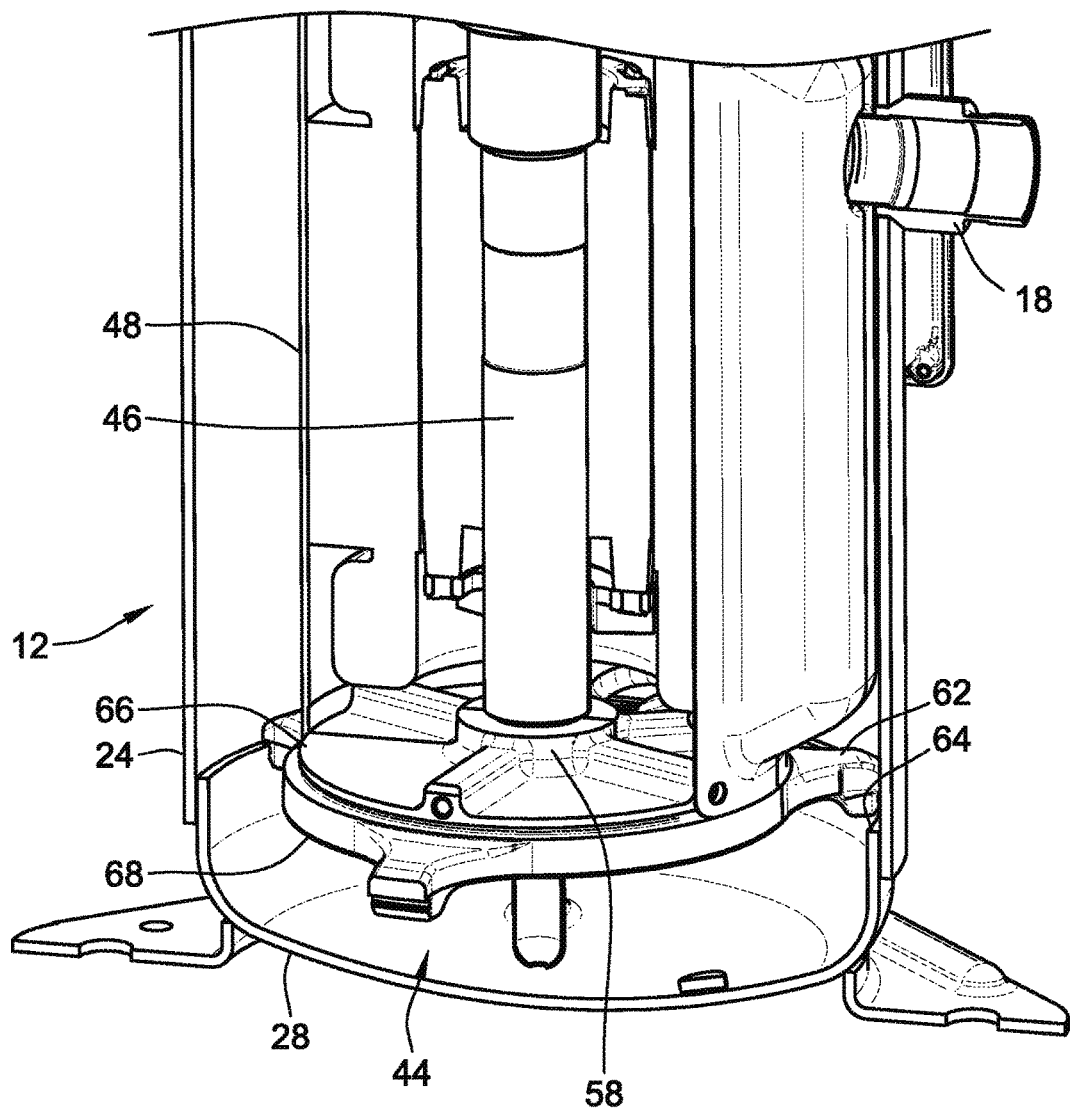
FIG. 4 is a cross-sectional isometric view of a lower portion of the scroll compressor assembly of FIG. 1

With reference to FIGS. 1 and 4, the lower bearing member 44 includes a central generally cylindrical hub 58 that includes a central bushing and opening to provide a cylindrical bearing 60 to which the drive shaft 46 is journaled for rotational support. A plurality of arms 62 and typically at least three arms project radially outward from the bearing central hub 58 preferably at equally spaced angular intervals. These support arms 62 engage and are seated on a circular seating surface 64 provided by the terminating circular edge of the bottom side wall region 34 of the bottom outer housing section 28. As such, the bottom housing section 28 can serve to locate, support and seat the lower bearing member 44 and thereby serves as a base upon which the internal components of the scroll compressor assembly can be supported.

Referring to FIG. 4, the lower bearing member 44 in turn supports the cylindrical motor housing 48 by virtue of a circular seat 66 formed on a plate-like ledge region 68 of the lower bearing member 44 that projects outward along the top of the central hub 58. The support arms 62 also preferably are closely toleranced relative to the inner diameter of the central housing section 24. The arms 62 may engage with the inner diameter surface of the central housing section 24 to centrally locate the lower bearing member 44 and thereby maintain position of the central axis 54. This can be by way of an interference and press-fit support arrangement between the lower bearing member 44 and the outer housing 12. Alternatively, according to a more preferred configuration shown in FIG. 1, the lower bearing member 44 engages with the lower housing section 28 which is in turn attached to center section 24. Likewise, the outer motor housing 48 may be supported with an interference and press-fit along the stepped seat 66 of the lower bearing member 44. In some embodiments, screws may be used to securely fasten the motor housing 48 to the lower bearing member 44.

The drive shaft 46 further includes an offset eccentric drive section 74 that has a cylindrical drive surface 75 about an offset axis that is offset relative to the central axis 54. This offset drive section 74 is journaled within a cavity of the movable scroll member 112 of the scroll compressor 14 to drive the movable scroll member 112 of the scroll compressor 14 about an orbital path when the drive shaft 46 is rotated about the central axis 54. To provide for lubrication of all of these bearing surfaces, the outer housing 12 provides an oil lubricant sump 76 at the bottom end in which suitable oil lubricant is provided. The drive shaft 46 has an impeller tube 47 that acts as an oil pump when the drive shaft 46 is spun and thereby pumps oil out of the lubricant sump 76 into an internal lubricant passageway 80 within the drive shaft 46. During rotation of the drive shaft 46, centrifugal force acts to drive lubricant oil up through the lubricant passageway 80 against the action of gravity. In are particular embodiment, the lubricant passageway 80 include various radial passages to feed oil through centrifugal force to appropriate bearing surfaces and thereby lubricate sliding surfaces as may be desired.

Figure 2:
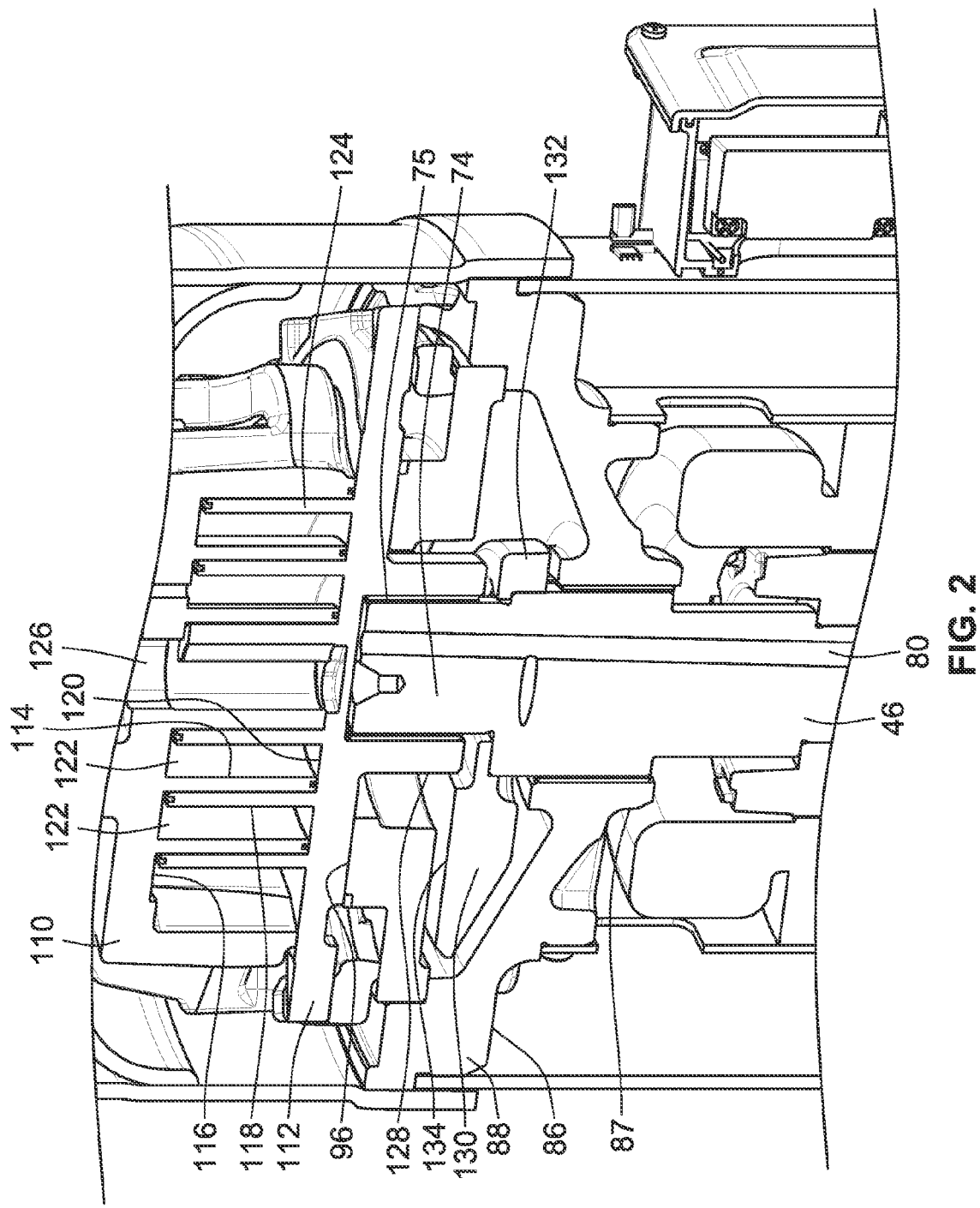
FIG. 2 is a cross-sectional isometric view of an upper portion of the scroll compressor assembly of FIG. 1.
Figure 3:
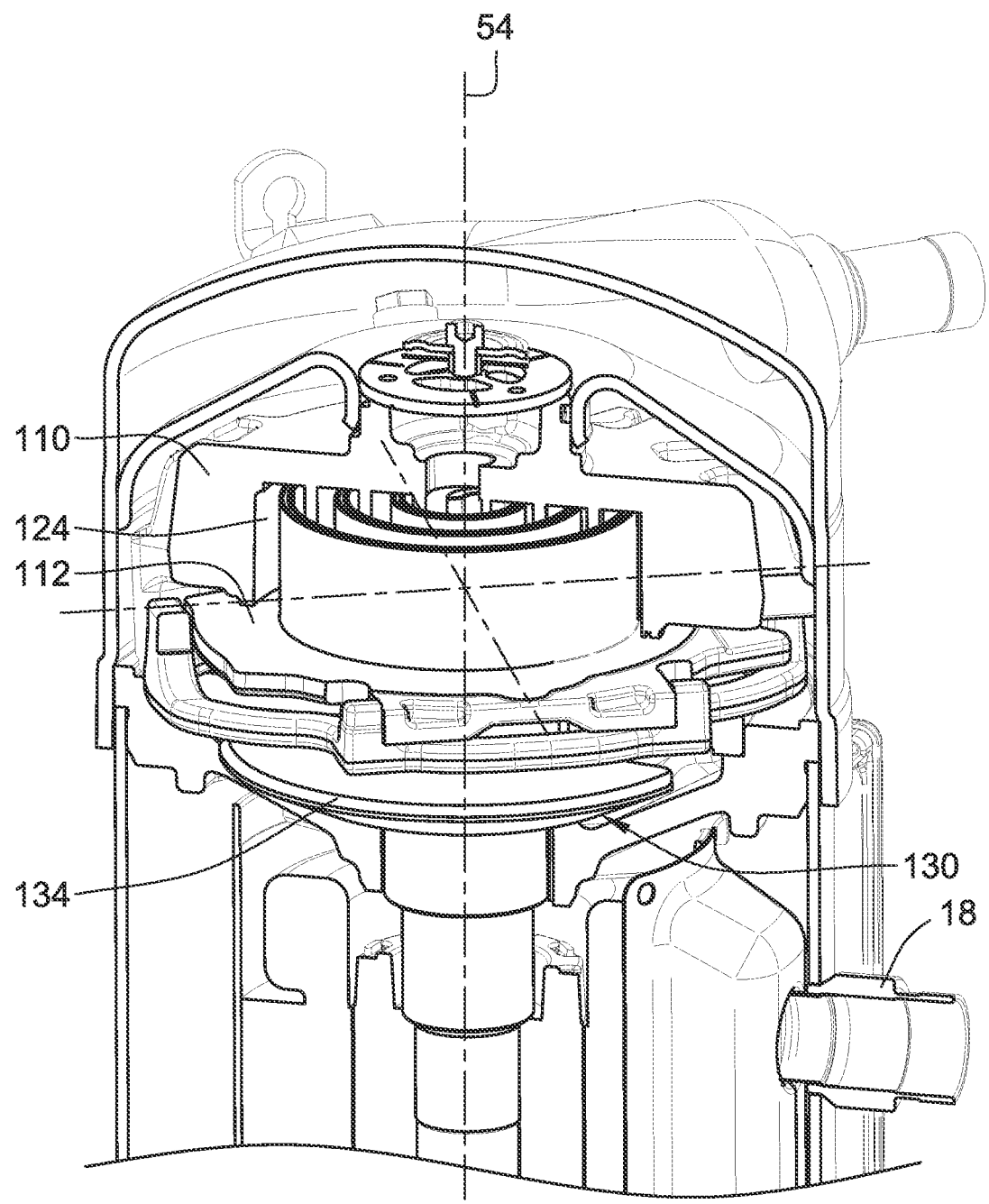
FIG. 3 is a cross-sectional isometric view of a top portion of the scroll compressor assembly of FIG. 1.

The upper bearing member, or crankcase, 42 includes a central bearing hub 87 into which the drive shaft 46 is journaled for rotation. Extending outward from the central bearing hub 87 is a disk-like portion 86 that terminates in an intermittent perimeter support surface 88. In the embodiments of FIGS. 2 and 3, the central bearing hub 87 extends below the disk-like portion 86, while a thrust bearing 84 is assembled above the disk-like portion 86 and contains a thrust surface 96, which provides axial support for the moveable scroll compressor body 112. In certain embodiments, the intermittent perimeter support surface 88 is adapted to have an interference and press-fit with the outer housing 12. It is understood that alternate embodiments of the invention may include crankcase posts with threaded holes to receive fasteners for assembly,. Alternate embodiments of the invention also include those in which the posts are integral with a pilot ring instead of the crankcase.

Turning in greater detail to the scroll compressor 14, the scroll compressor body is provided by first and second scroll compressor bodies which preferably include a relatively stationary fixed scroll compressor member 110 and a second scroll compressor member 112 movable relative to the fixed scroll compressor member 110. The second scroll compressor member 112 is arranged for orbital movement relative to the fixed scroll compressor member 110 for the purpose of compressing refrigerant. The fixed scroll compressor member 110 includes a first rib 114 projecting axially from a plate-like base 116 and is designed in the form of a spiral. Similarly, the second movable scroll compressor body 112 includes a second scroll rib 118 projecting axially from a plate-like base 120 and is in the design form of a similar spiral.

Turning in greater detail to the scroll compressor 14, the scroll compressor includes first and second scroll compressor bodies which preferably include a stationary fixed scroll compressor body 110 and a movable scroll compressor body 112. While the term "fixed" generally means stationary or immovable in the context of this application, more specifically "fixed" refers to the non-orbiting, non-driven scroll member, as it is acknowledged that some limited range of axial, radial, and rotational movement is possible due to thermal expansion and/or design tolerances.

The scroll ribs 114, 118 engage in one another and abut sealingly on the respective base surfaces 120, 116 of the respectively other compressor body 112, 110. As a result, multiple compression chambers 122 are formed between the scroll ribs 114, 118 and the bases 120, 116 of the respective compressor bodies 112, 110. Within the chambers 122, progressive compression of refrigerant takes place. Refrigerant flows with an initial low pressure via an intake area 124 surrounding the scroll ribs 114, 118 in the outer radial region. Following the progressive compression in the chambers 122 (as the chambers progressively are defined radially inward), the refrigerant exits via a discharge port 126 which is defined centrally within the base 116 of the fixed scroll compressor member 110. Refrigerant that has been compressed to a high pressure can exit the chambers 122 via the discharge port 126 during operation of the scroll compressor.

The movable scroll compressor body 112 engages the eccentric offset drive section 74 of the drive shaft 46. More specifically, the receiving portion of the movable scroll compressor body 112 includes a cylindrical bushing drive hub 128 which slideably receives the eccentric offset drive section 74 with a slideable bearing surface provided therein. In detail, the eccentric offset drive section 74 engages the cylindrical drive hub 128 in order to move the second scroll compressor member 112 about an orbital path about the central axis 54 during rotation of the drive shaft 46 about the central axis 54. Considering that this offset relationship causes a weight imbalance relative to the central axis 54, the assembly preferably includes a counter weight 130 that is mounted at a fixed angular orientation to the drive shaft 46.

The counter weight 130 acts to offset the weight imbalance caused by the eccentric offset drive section 74 and the movable scroll compressor body 112 that is driven about an orbital path (e.g. among other things, the scroll rib is not equally balanced). The counter weight 130 includes an attachment collar 132 and an offset weight region 134 (see counter weight 130 shown in FIG. 3) that provides for the counter weight effect and thereby balancing of the forces of the rotating components about the central axis 54. This provides for reduced vibration and noise of the overall assembly by internally balancing or canceling out inertial forces.

Referring in greater detail to the fixed scroll compressor member 110, this body 110 is fixed to the upper bearing member 42, capturing the second scroll compressor member 112 between the fixed scroll member 110 and the upper bearing member 42. In a particular embodiment, the fixed scroll compressor body 110, together with the separator plate 30, separates a high pressure chamber 180 from the relatively lower pressure region of the compressor 14 contained within the outer housing 12. The central hub 178 of the fixed scroll compressor 110 body includes a circumferential O-ring groove 177, and when assembled with an O-ring 179, seals against the central cylindrical bore of the separator plate 30, preventing the return of high pressure compressed refrigerant to the relatively lower pressure region of the compressor assembly 14. At the interface between the separator plate 30 and the top end housing section 26, a fillet weld joins the end face of the outer cylindrical wall section of the separator plate 30 with the inside surface of the top end housing section 26, thus preventing the return of high pressure compressed refrigerant to the relatively lower pressure region of the compressor assembly 14.

The fillet weld allows for the separator plate 30 to be assembled to the top end housing section 26 prior to final assembly and weld of the compressor housing 12. This allows for inspection and confirmation of positional alignment between the central axis 54 of the top end housing section 26 and the central cylindrical bore of the separator plate 30.

Figure 5:
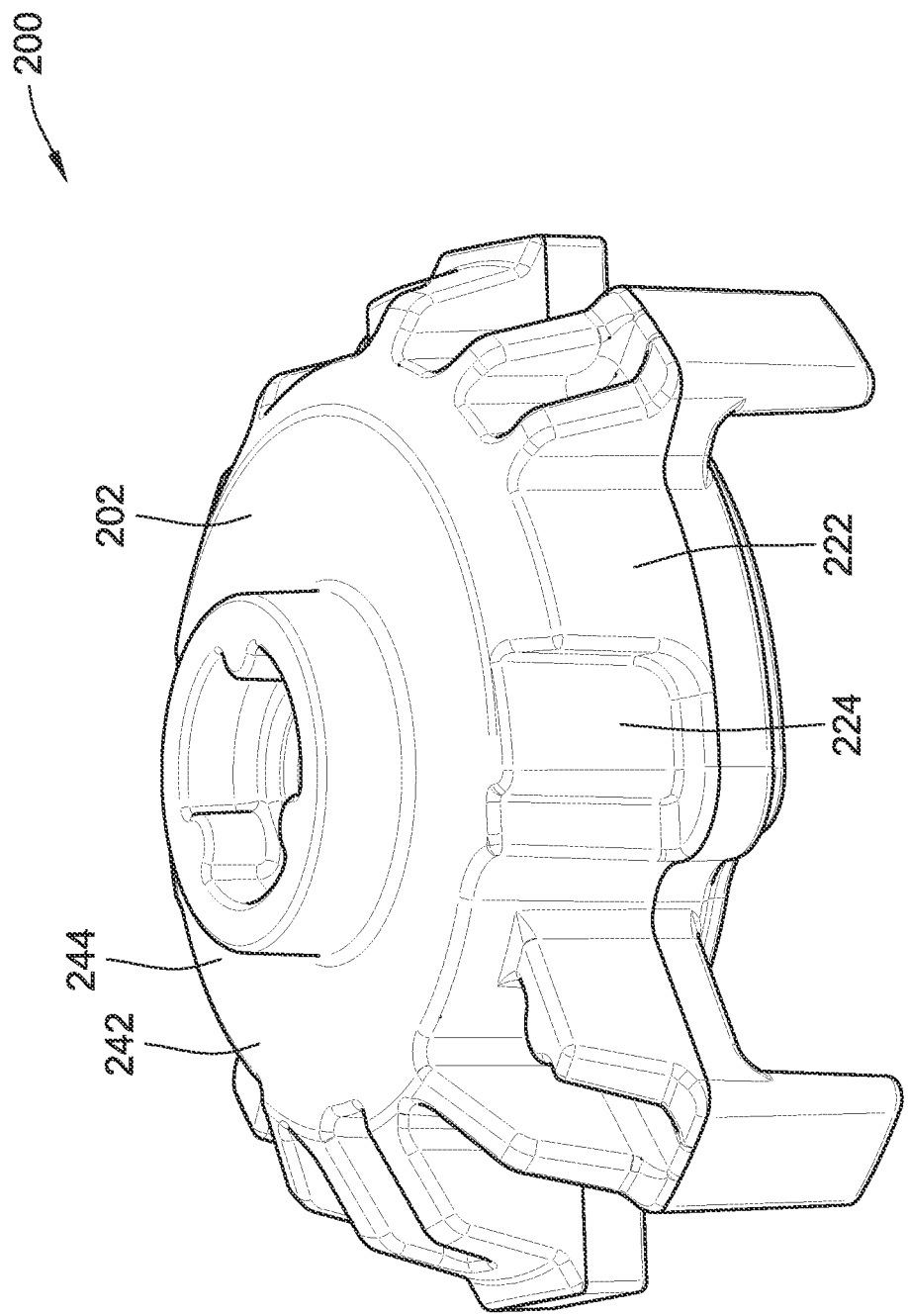
FIG. 5 is a perspective top view of the fixed scroll compressor body casting, in accordance with an embodiment of the invention.
Figure 6:
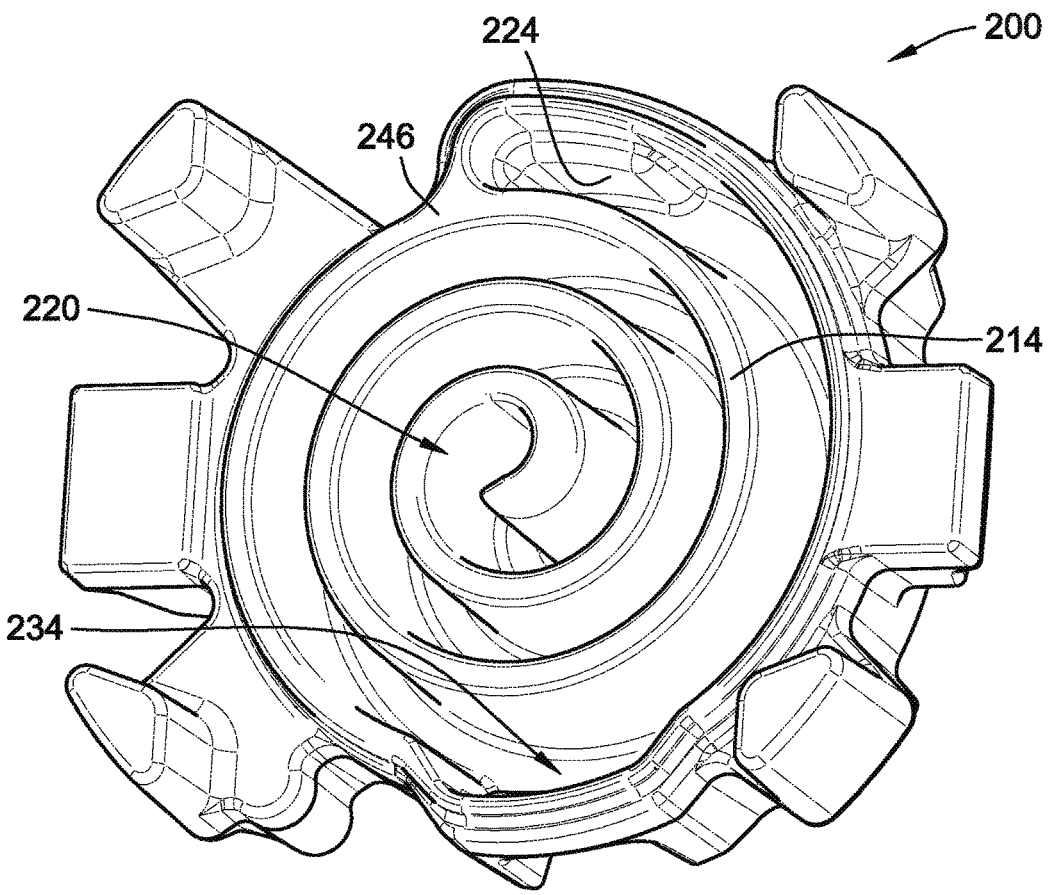
FIG. 6 is a perspective bottom view of the fixed scroll compressor body casting of FIG. 5.
Figure 7:
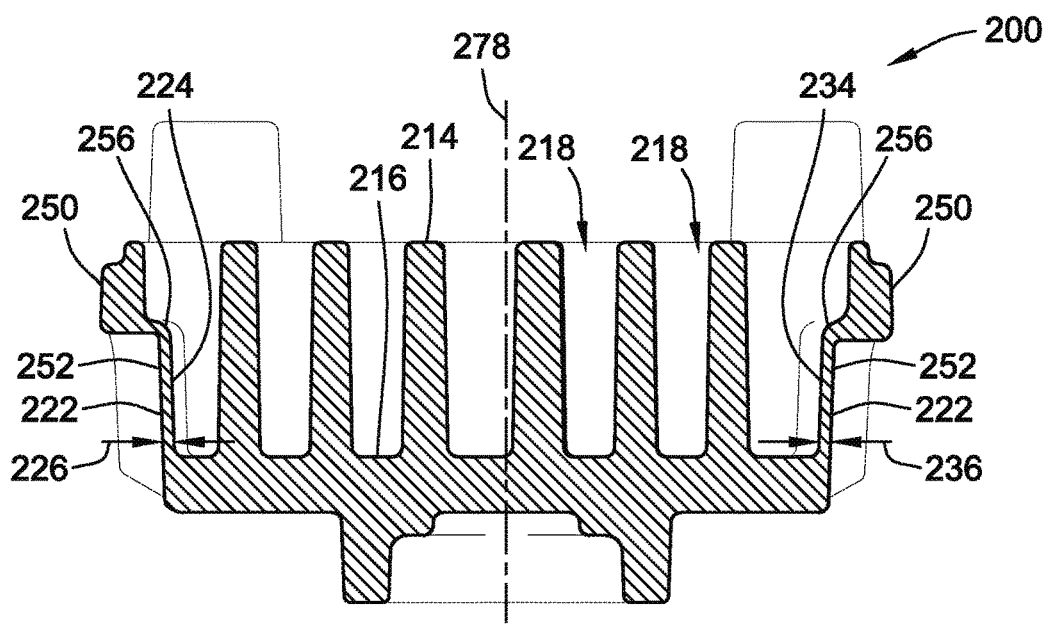
FIG. 7 is a cross-sectional view of the fixed scroll compressor body casting FIGS. 5 and 6.

FIGS. 5 and 6 provide top and bottom perspective views of a fixed scroll compressor body casting 200, in accordance with an embodiment of the invention. After machining, the fixed scroll compressor body casting 200 could be incorporated into the above-described scroll compressor assembly 10. FIG. 7 is a cross-sectional view of the fixed scroll compressor body casting 200. The fixed scroll compressor body casting 200 has a central body portion 202 with a plate-like base 216 with a spiral scroll rib 214 projecting axially from the plate-like base 216. The spiral scroll rib 214 includes a volume 218 between adjacent walls of spiral scroll rib 214 for the compressing of refrigerant. The spiral scroll rib 214 spirals from a central region 220 of the plate-like base 216 to an outer wall 222 of the central body portion 202.

As shown in FIGS. 5-7, the fixed scroll compressor body casting 200 includes a first inward-protruding portion 224 that protrudes radially inward from the outer wall 222 into the volume 218. The radially-extending distance that the first inward-protruding portion 224 protrudes into the volume 218 is greater than a radial-extending thickness 226 of the first inward-protruding portion 224, such that removal of the first inward-protruding portion 224 results in a first intake opening 272 (shown in FIGS. 8 and 9) in the outer wall 222.

The first intake opening 272 provides a path for a flow of refrigerant into the volume 218.

In a particular embodiment, the fixed scroll compressor body casting 200 includes a second inward-protruding portion 234 that protrudes radially inward from the outer wall 222 into the volume 218. The distance that the second inward-protruding portion 234 protrudes into the volume 218 is greater than a thickness 236 of the second inward-protruding portion 234, such that removal of the second inward-protruding portion 234 results in a second intake opening 274 (shown in FIGS. 8 and 9) in the outer wall 222. In a more particular embodiment, the second intake opening 274 is located on a side of the central body portion 202 opposite the first intake opening 272. The first and second inward-protruding portions 224, 234 may be rectangular, though other shapes for the first and second inward-protruding portions 224, 234 are envisioned.

In the embodiments disclosed, the first inward-protruding portion 224 is solid and continuous with the outer wall 222. In particular embodiments of the invention, the transition between the outer wall 222 and the first inward-protruding portion 224 is via a smooth curved portion of the outer wall 222 having no corners, sharp edges, or steps. Similarly, the second inward-protruding portion 234 is solid and continuous with another portion of the outer wall 222 in which the transition between the outer wall 222 and the second inward-protruding portion 234 is free of corners, sharp edges, or steps.

In certain embodiments, the casting 200 has an outer surface 242 configured to be cast without cores in a two-part mold (not shown), the outer surface 242 having a top side surface 244 facing vertically upward and a bottom side surface 246 facing vertically downward, wherein the top side surface 244 is free of any radially-extending undercuts and wherein the bottom side surface 246 is free of any radially-extending undercuts. Further, some embodiments call for casting the fixed scroll compressor body 200 with a two-piece mold (not shown) having only a mold cope and a mold drag, such that the two-piece mold has no core inserts.

In some embodiments, the first and second inward-protruding portions 224, 234 each include a first axially-extending segment 250, and a second axially-extending segment 252. The first and second axially-extending segments 250, 252 are joined by a radially-extending step 256 that forms part of the first and second inward protruding portions 224, 234, such that the first axially-extending segment 250 is radially offset and radially outward from the second axially-extending segment 252. Each second axially-extending segment 252 extends from the radially-extending step 256 to a perimeter of the plate-like base 216. The first axially-extending segment 250 is radially offset from the second axially-extending segment 252 by at least one-eighth (⅛) of an inch.

Figure 8:
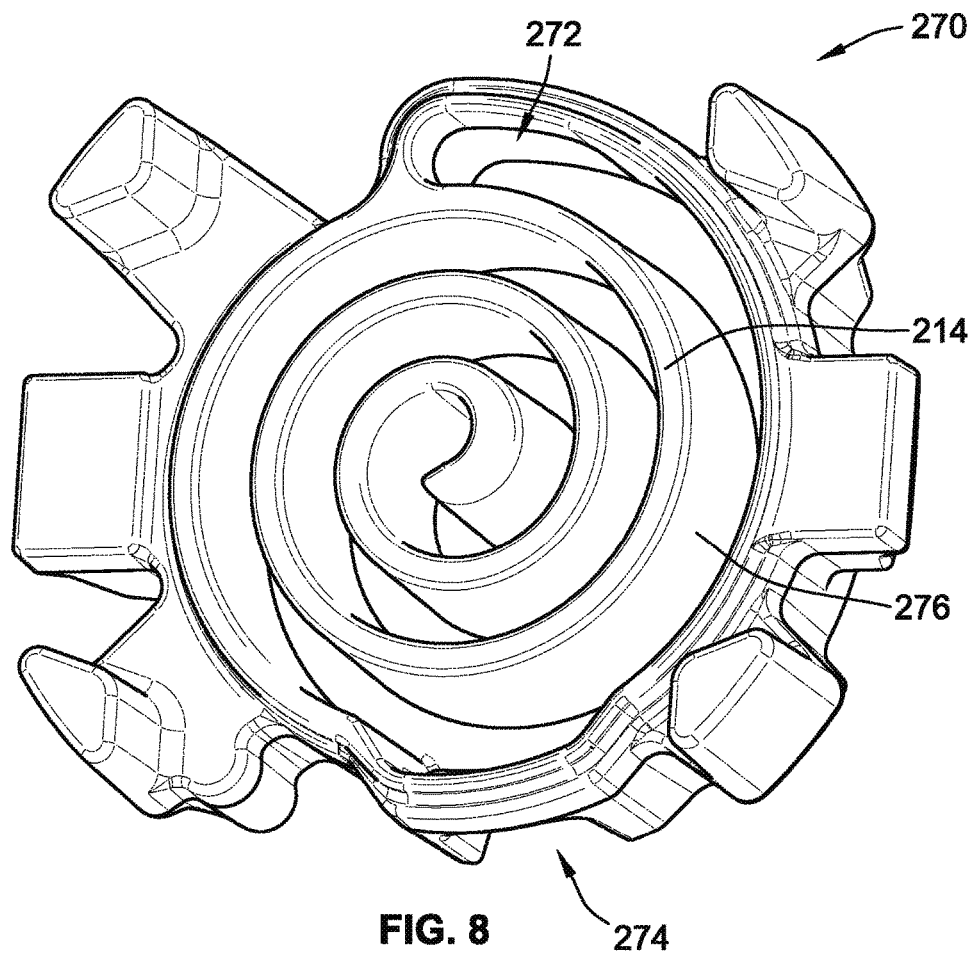
FIG. 8 is a perspective bottom view of the fixed scroll compressor body post-machining, in accordance with an embodiment of the invention.
Figure 9:
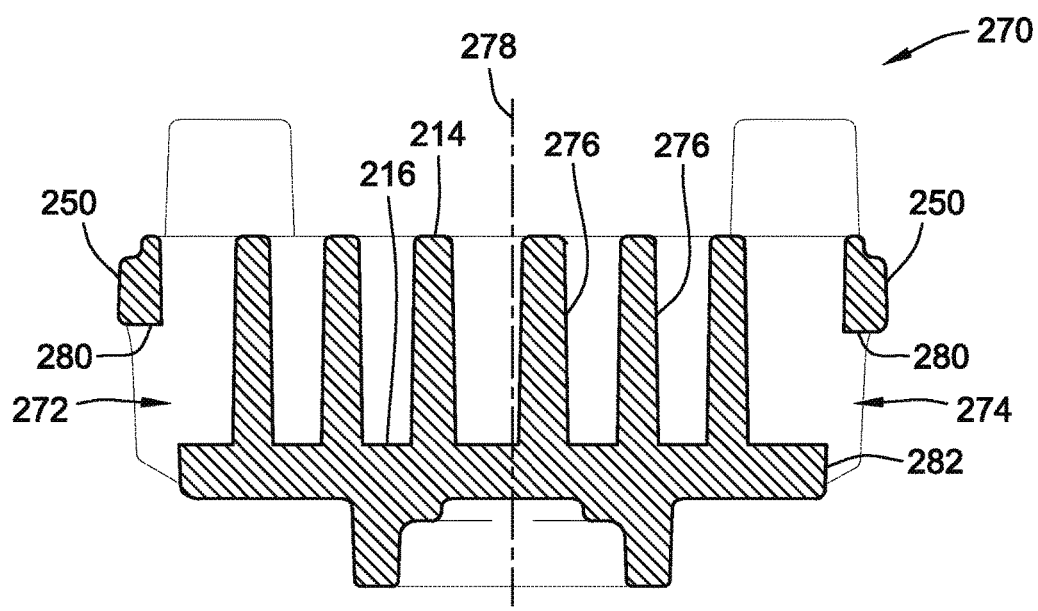
FIG. 9 is a cross-sectional view of the fixed scroll compressor body post-machining of FIG. 8.

FIGS. 8 and 9 provide a bottom perspective view and a cross-sectional view, respectively, of a machined fixed scroll compressor body 270, in accordance with an embodiment of the invention. It can be seen from FIG. 8 that, in machining the casting 200 to produce machined fixed scroll compressor body 270, the process removes the first and second inward-protruding portions 224, 234 to create first intake opening 272 and second intake opening 274. While those of skill in the art will recognize that alternate embodiments of the invention may include only one inward-protruding portions to create one intake opening, post-machining, the exemplary embodiments illustrated and described herein include a fixed scroll compressor body with two inward-protruding portions, or two intake openings.

In a particular embodiment, a single tool bit, for example a cylindrical milling bit, is used to simultaneously machine the axially-extending surface 276 of the scroll rib 214 while removing the first and second inward-protruding portions 224, 234 (see FIGS. 5-7). Typically, during the machining the single tool bit is aligned to be parallel with a central axis 278 of the fixed scroll compressor body 270. It should be noted, however, that not all of the surfaces surrounding the first and second intake openings 272, 274 are machined. By not machining those surfaces which do not necessarily require machining, the time, complexity, and cost of manufacturing the fixed scroll compressor body 270 are reduced.

In a particular embodiment, the aforementioned process for machining the axially-extending surfaces 276 of the scroll rib 214, and for removing the first and second inward-protruding portions 224, 234 (see FIGS. 5-7), results in at least two unmachined edge surfaces: 1) a radially-extending edge 280 of a first axially-extending segment 250 of the outer wall 222, the radially-extending edge 280 defining a first side of each of the first and second intake openings 272, 274; and 2) an axially-extending edge 282 of a perimeter of the plate-like base 216, the axially-extending edge 282 defining a second side of each of the first and second intake openings 272, 274 opposite the first side.

The unmachined surfaces, i.e., edges 280, 282, do not adversely affect performance of the first and second intake openings 272, 274. However, these intake openings 272, 274 are created without adding any additional process steps, because the structure of the casting 200 is such that the intake openings 272, 274 are created by the same process used to machine the axially-extending surface 276 of the scroll rib 214.

As stated above, during operation of a compressor incorporating the fixed scroll compressor body 270, refrigerant flows with an initial low pressure into the first and second intake openings 272, 274, and into volume 218 where the refrigerant is compressed. As with the inward-protruding portions 224, 234 mentioned above, the first and second intake openings 272, 274 may be rectangular, though various other shapes are envisioned.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fixed scroll compressor body comprising:
    a scroll compressor body casting, the casting comprising:
        a central body portion having a plate-like base with a spiral scroll rib projecting axially from the plate-like base, wherein the spiral scroll rib includes a volume between the spiraled ribs for the compressing of refrigerant, and wherein the spiral scroll rib spirals from a central region of the plate-like base to an outer wall of the central body portion; and
        a first inward-protruding portion that protrudes from the outer wall into the volume wherein a radially-extending distance, that the first inward-protruding portion protrudes into the volume, is greater than a radially-extending thickness of the first inward-protruding portion such that removal of the first inward-protruding portion is configured to result in a first intake opening in the outer wall, the first intake opening providing a path for a flow of refrigerant into the volume.

2. The fixed scroll compressor body of claim 1, further comprising a second inward-protruding portion that protrudes from the outer wall into the volume wherein a distance, that the second inward-protruding portion protrudes into the volume, is greater than a thickness of the second inward-protruding portion such that removal of the second inward-protruding portion results in a second intake opening in the outer wall.

3. The fixed scroll compressor body of claim 2, wherein the second inward-protruding portion is located on a side of the central body portion opposite the first inward-protruding portion.

4. The fixed scroll compressor body of claim 1, wherein the first inward-protruding portion is rectangular.

5. The fixed scroll compressor body of claim 1, wherein the casting has an outer surface configured to be cast without cores in a two-part mold, the outer surface having a top side surface facing vertically upward and a bottom side surface facing vertically downward, wherein the top side surface is free of any radially-extending undercuts and wherein the bottom side surface is free of any radially-extending undercuts.

6. The fixed scroll compressor body of claim 1, wherein the outer wall includes a first axially-extending segment, and wherein the outer wall includes the first inward-protruding portion which provides a second axially-extending segment, the first and second axially-extending segments joined by a radially-extending step that forms part of the inward protruding portion, such that the first axially-extending segment is radially offset and radially outward from the second axially-extending segment.

7. The fixed scroll compressor body of claim 6, wherein the second axially-extending segment extends from the radially-extending step to a perimeter of the plate-like base, and wherein the first axially-extending segment is radially offset from the second axially-extending segment by at least ⅛ of an inch.

8. A method of manufacturing a scroll compressor body comprising:
    providing a clamshell casting mold for the scroll compressor body;
    casting the scroll compressor body, wherein casting the scroll compressor body comprises casting the scroll compressor body with:
        a central body portion having a plate-like base with a spiral scroll rib projecting axially from the plate-like base, wherein the spiral scroll rib includes a volume between the spiraled ribs for the compressing of refrigerant, and wherein the spiral scroll rib spirals from a central region of the plate-like base to an outer wall of the central body portion; and
        a first inward-protruding portion that protrudes from the outer wall into the volume wherein a radially-extending distance, that the first inward-protruding portion protrudes into the volume, is greater than a radially-extending thickness of the first inward-protruding portion such that removal of the first inward-protruding portion results in a first intake opening in the outer wall, the first intake opening providing a path for a flow of refrigerant into the volume;
    inserting a tool between the spiral scroll ribs to machine surfaces of the scroll ribs; and
    locating the first inward-protruding portion such that the tool removes the first inward-protruding portion while machining the surfaces of the scroll ribs to create the first intake opening.

9. The method of claim 8, wherein casting the scroll compressor body comprises casting the scroll compressor body with a second inward-protruding portion that protrudes from the outer wall into the volume, and wherein a distance that the second inward-protruding portion protrudes into the volume is greater than a thickness of the second inward-protruding portion such that removal of the second inward-protruding portion results in a second intake opening in the outer wall, the second intake opening providing a path for a flow of refrigerant into the volume.

10. The method of claim 9, further comprising locating the second intake opening on a side of the central body portion opposite the first intake opening.

11. The method of claim 8, wherein casting the scroll compressor body comprises casting the scroll compressor body with a rectangular first inward-protruding portion.

12. The method of claim 8, wherein casting the scroll compressor body comprises casting the scroll compressor body with a two-piece mold having only a mold cope and a mold drag, the two-piece mold having no core inserts.

13. The method of claim 8, further comprising using a single tool bit to simultaneously machine an axially-extending surface of the scroll ribs while removing the first inward-protruding portion.

14. The method of claim 13, wherein using the single tool bit to simultaneously machine the axially-extending surface of the scroll ribs while removing the first inward-protruding portion comprises aligning the single tool bit parallel to a central axis of the scroll compressor body.

15. The method of claim 13, wherein simultaneously machining the axially-extending surfaces of the scroll ribs and removing the first inward-protruding portion results in at least two unmachined edge surfaces:
1) a radially-extending edge of a first axially-extending segment of the outer wall, the radially-extending edge defining a first side of the first intake opening; and
2) an axially-extending edge of a perimeter of the plate-like base, the axially-extending edge defining a second side of the first intake opening opposite the first side.

16. A scroll compressor comprising:
scroll compressor bodies disposed in a housing, the scroll bodies including a fixed scroll body and a moveable scroll body, the fixed and moveable scroll bodies having respective bases and respective scroll ribs that project from the respective bases, wherein the scroll ribs mutually engage, the moveable scroll body being movable relative to the fixed scroll body for compressing refrigerant;
wherein the fixed scroll body comprises:
a central body portion having a plate-like base with a spiral scroll rib projecting axially therefrom, wherein the spiral scroll rib includes a volume between the spiraled ribs for the compressing of refrigerant, and wherein the spiral scroll rib spirals from a central region of the plate-like base to an outer wall of the central body portion; and
a first intake opening in the outer wall, the first intake opening providing a path for a flow of refrigerant into the volume, the outer wall having a machined inner peripheral surface surrounding at least three sides of the first intake opening, the first intake opening including an unmachined axially-extending edge segment that defines a first side of the first intake opening, and further including an unmachined radially-extending segment that defines a second side of the first intake opening opposite the first side.

17. The scroll compressor of claim 16, wherein the fixed scroll body further comprises a second intake opening formed in a different part of the outer wall than the first intake opening, the second intake opening providing a path for a flow of refrigerant into the volume, the outer wall having the machined inner peripheral surface surrounding at least three sides of the second intake opening, the second intake opening including an unmachined axially-extending edge segment that defines a first side of the second intake opening, and further including an unmachined radially-extending segment that defines a second side of the second intake opening opposite the first side.

18. The scroll compressor of claim 17, wherein the second intake opening is located on a side of the central body portion opposite the first intake opening.

19. The scroll compressor of claim 16, wherein the machined inner peripheral surface has a surface roughness that is less than that of the unmachined radially-extending segment, and is also less than that of the unmachined axially-extending edge segment.

20. The scroll compressor of claim 16, wherein the first intake opening is rectangular.

21. The scroll compressor of claim 16, wherein the unmachined radially-extending segment is radially offset and radially outward from the unmachined axially-extending edge segment with respect to a central axis of the fixed scroll body.

22. The scroll compressor of claim 21, wherein the unmachined radially-extending segment is radially offset from the unmachined axially-extending edge segment by at least ⅛ of an inch.

* * * * *